(12) United States Patent
DiVincenzo et al.

(10) Patent No.: US 7,889,992 B1
(45) Date of Patent: Feb. 15, 2011

(54) HYBRID SUPERCONDUCTOR-OPTICAL QUANTUM REPEATER

(75) Inventors: David P. DiVincenzo, Pleasantville, NY (US); Philip C. D. Hobbs, Briarcliff Manor, NY (US); Shwetank Kumar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/563,183

(22) Filed: Sep. 21, 2009

(51) Int. Cl.
*H04B 10/16* (2006.01)
(52) U.S. Cl. ...................... 398/115; 398/116
(58) Field of Classification Search ................. 398/115, 398/116
See application file for complete search history.

(56) References Cited

U.S. PATENT DOCUMENTS

| | | | |
|---|---|---|---|
| 6,563,311 B2 | 5/2003 | Zagoskin | |
| 6,665,486 B2 | 12/2003 | Tomita | |
| 6,930,320 B2 | 8/2005 | Blais et al. | |
| 7,006,267 B2 * | 2/2006 | Franson et al. | 359/107 |
| 7,248,695 B1 * | 7/2007 | Beal et al. | 380/256 |
| 7,317,574 B2 * | 1/2008 | Zoller et al. | 359/577 |
| 7,346,246 B2 | 3/2008 | Munro et al. | |

FOREIGN PATENT DOCUMENTS

WO WO 2007/021945 A2 2/2007

OTHER PUBLICATIONS

Briegel, H.-J. et al., "Quantum Repeaters: The Role of Imperfect Local Operations in Quantum Communication", The American Physical Society, Physical Review Letters, vol. 81, No. 26, Dec. 28, 1998, pp. 5932-5935.
DiVincenzo, David P., "The Physical Implementation of Quantum Computation", Fortschritte der Physik 48, 2000, available at arxiv. org: quant-ph/0002077, pp. 771-784.
Duan, Lu-Ming et al., "Long-distance quantum communication with atomic ensembles and linear optics", Nature, vol. 414, Nov. 2001, pp. 413-418.
Hobbs, Philip C. et al., "Efficient waveguide-integrated tunnel junction detectors at 1.6 um", Optics Express, vol. 15, No. 25, Dec. 10, 2007, pp. 16376-16389.
Hong, C.K. et al., "Measurement of Subpicosecond Time Intervals between Two Photons by Interference", Physical Review Letters, vol. 59, No. 18, 1987, pp. 2044-2046.

(Continued)

*Primary Examiner*—Evan Pert
(74) *Attorney, Agent, or Firm*—Stephen J. Walder, Jr.; Vazken A. . Alexanian

(57) ABSTRACT

A hybrid superconductor-optical quantum repeater is provided. The hybrid superconductor-optical quantum repeater comprises an optical subsystem configured to receive an optical signal via an optical channel and a superconductor subsystem coupled to the optical subsystem. The optical subsystem and superconductor subsystem are coupled to one another via a microwave transmission medium. The optical subsystem is configured to receive an optical signal via the optical channel and down-convert a photon of the optical signal to a microwave photon in a microwave output signal that is output to the superconductor subsystem via the microwave transmission medium. The superconductor subsystem stores a quantum state of the microwave photon and transmits the microwave photon along an output channel from the superconductor subsystem.

20 Claims, 5 Drawing Sheets

OTHER PUBLICATIONS

Knight, Will, "Quantum repeater promises complete long distance secrecy", NewScientist, Nov. 22, 2001, http://www.newscientist.com/article/dn1595, 3 pages.

Koch, R.H. et al., "Experimental Demonstration of an Oscillator Stabilized Josephson Flux Qubit", The American Physical Society, Physical Review Letters, PRL 96, 127001 (2006), week ending Mar. 31, 2006, pp. 127001-1-127001-4.

Ladd, T.D., "Hybrid quantum repeater based on dispersive CQED interactions between matter qubits and bright coherent light", New Journal of Physics 8, Sep. 8, 2006, pp. 1-42.

Majer, J. et al., "Coupling superconducting qubits via a cavity bus", Nature, vol. 449, Sep. 2007, pp. 443-447.

Moehring, D.L. et al., "Entanglement of single-atom quantum bits at a distance", Nature, vol. 449, Sep. 2007, pp. 68-72.

Pellizzari, T et al., "Decoherence, Continuous Observation, and Quantum Computing: A Cavity QED Model", Physical Review Letters, vol. 75, No. 21, Nov. 1995, pp. 3788-3791.

Sangouard, Nicolas et al., "Robust and Efficient Quantum Repeaters with Atomic Ensembles and Linear Optics", http://arxiv.org/PS_cache/arxiv/pdf/0802/0802.1475v1.pdf, Feb. 2008, pp. 1-7.

Van Loock, P. et al., "Hybrid Quantum Repeater Using Bright Coherent Light", The American Physical Society, Physical Review Letters, PRL 96, 240501 (2206), week ending Jun. 23, 2006, pp. 240501-1-240501-4.

Albota, Marius A. et al., "Efficient single-photon counting at 1.55 μm by means of frequency upconversion", Optics Letters, vol. 29, No. 13, Jul. 1, 2004, pp. 1449-1451.

Albota, Marius A. et al., "Polarization-independent frequency conversion for quantum optical communication", J. Opt. Soc. Am. B, vol. 23, No. 5, May 2006, pp. 918-924.

Strekalov, D.V. et al., "Efficient Upconversion of sub-THz radiation in a high-Q whispering gallery resonator", Opt. Lett. 34, 2009, pp. 713-715.

Strekalov, D.V. et al., "Microwave whispering-gallery resonator for efficient optical up-conversion", The American Physical Society, Physical Review A 80, 033810, 2009, pp. 033810-1 to 033810-5.

* cited by examiner

HYBRID SUPERCONDUCTOR-OPTICAL QUANTUM REPEATER

BACKGROUND

The present application relates generally to an improved data processing apparatus and method and more specifically to hybrid superconductor-optical quantum repeater mechanism, apparatus/system employing such a hybrid superconductor-optical quantum repeater mechanism, and method for implementing and using such a hybrid superconductor-optical quantum repeater mechanism.

A quantum computer is a computing device that performs calculations based on the behavior of particles at the subatomic level. With quantum computers, the data units, i.e. the quantum bits or "qubits," can exist in more than one state at a time allowing the quantum computer to have multiple "paths of thought" existing independently of each other even though they all are associated with the same set of particles. In this way, a quantum computer can potentially achieve millions of instructions per second (MIPS) more than known non-quantum computing systems.

The qubit is a binary digit, or bit, similar to that of a classical computer, but that can have several values simultaneously. Essentially, a qubit can be thought of as a particle that has multiple dimensions, each of which can have a high or low state, e.g., a logic 1 or logic 0 state. Hence, two qubits can have four simultaneous and independent states (00, 01, 10, and 11).

In a distributed quantum computing environment, the ability to transfer qubits of data between remote locations is an important factor. With such a distributed system, photons can be transmitted through light conducting fibers or other media to convey quantum information from one quantum computer to another. However, such transmissions are generally subject to signal loss and losses in coherence. For example, as described in Munro et al, "Quantum Repeater," WO 2007021945 A2, filed Aug. 11, 2006, an optical signal when transmitted 10 km along a typical optical fiber experiences a 1.9 dB loss such that a single photon may have a 50% probability of being lost. Loss and decoherence effects on duplicated or redundant quantum states can create noisy entangled states that may reliably convey quantum information over limited distances, but transmissions over large distances generally require quantum repeaters.

A quantum repeater is a well understood device (see Duan et al., "Long-Distance Quantum Communication with Atomic Ensembles and Linear Optics," Nature 414, 413-418 (2001)) which permits qubits (understood to be in the form of photons), which are transmitted along a noisy channel, to be largely restored to their original transmitted quantum state by error correction. The repeater is typically envisioned to enable this by bringing the photons to a halt by transforming them to another matter-based form (see Pellizzari et al., "Decoherence Continuous Observation, and Quantum Computing: A Cavity QED Model," Phys. Rev. Lett. 75, 3788 (1995)) constituting a quantum memory (in present experimental proposals, involving a trapped ion (see Moehring et al., "Entanglement of Single-Atom Quantum Bits at a Distance," Nature 449, 68-71 (Sep. 6, 2007)) or a semiconductor quantum dot (van Loock et al., "Hybrid Quantum Repeater Using Bright Coherent Light," Phys. Rev. Lett. 96, 240501 (2006)).

While in memory, these qubits are subject to some quantum logic operations that serve to perform quantum parity checks of various known kinds, which permit the occurrence of errors to be detected and corrected. After these corrective steps, the restored quantum states are again subject to a conversion of embodiment, and the quantum information proceeds on another channel. Either the incoming or outgoing channel may be a teleportation channel, meaning that the photons travel in the direction opposite to that of the quantum information, which is conveyed by the application of a Bell-type quantum measurement, followed by the transmission of classical information in the forward direction.

A quantum repeater is a key element in quantum information processing systems. Its envisioned applications are (1) it can be used to boost the distance and key generation rates at which secure quantum cryptography can operate; (2) it can provide reliable long distance quantum communication for other cryptographic tasks, including secret sharing, quantum data hiding, quantum unlocking, and quantum digital signatures; (3) it can enable other long-distance communication tasks that can be done efficiently with quantum transmissions, including remote memory allocation (sampling complexity), and remote appointment scheduling; and (4) the quantum repeater can be used the distribute any form of quantum computation, so that, for example, a prime factorization problem requiring $10^9$ entangled qubits could be accomplished by interconnecting a network of small processors, each containing, say $10^5$ qubits.

Most previous studies aimed at making a quantum repeater have focused on systems with stationary qubits that are also manipulated optically. The initial theoretical work (described in Pellizzari et al.) envisioned transmitted photons being brought into an optical cavity and caused to interact with a trapped ion or atom. Subsequent work has enlarged this to include trapped atomic clouds (see Sangouard et al. "Robust and Efficient Quantum Repeaters with Atomic Ensembles and Linear Optics," available at http://arxiv.org/PS_cache/arxiv/pdf/0802/0802.1475v1.pdf), as well as optically addressed quantum dots (see van Loock et al.). No use of superconducting qubits is contemplated in this work. In the area of superconducting qubits, interconversion to light quanta in the GHz frequency range is contemplated (see Majer et al. "Coupling Superconducting Qubits via a Cavity Bus," Nature 449, 443-447 (Sep. 27, 2007)), however none of these works have contemplated superconducting qubits with interconversion to infrared or visible frequencies.

SUMMARY

In one illustrative embodiment, a hybrid superconductor-optical quantum repeater is provided. The hybrid superconductor-optical quantum repeater comprises an optical subsystem configured to receive an optical signal via an optical channel and a superconductor subsystem coupled to the optical subsystem. The optical subsystem and superconductor subsystem are coupled to one another via a microwave transmission medium. The optical subsystem is configured to receive an optical signal via the optical channel and down-convert a photon of the optical signal to a microwave photon in a microwave output signal that is output to the superconductor subsystem via the microwave transmission medium. The superconductor subsystem stores a quantum state of the microwave photon and transmits the microwave photon along an output channel from the superconductor subsystem.

In another illustrative embodiment, a method, in a hybrid superconductor-optical quantum repeater, for transmitting qubits between quantum computer subsystems is provided. The method comprises receiving an optical input signal in an optical subsystem of the hybrid superconductor-optical quantum repeater from a first quantum computer subsystem. The method further comprises down-converting the optical input signal to a microwave signal, thereby mapping a optical wavelength photon of the optical input signal to a microwave wavelength photon of the microwave signal. Moreover, the method comprises inputting the microwave signal to a superconductor subsystem of the hybrid superconductor-optical quantum repeater. Furthermore, the method comprises storing a quantum state of the microwave wavelength photon in the superconductor subsystem. In addition, the method comprises transmitting the microwave wavelength photon along an output channel from the superconductor subsystem.

In yet another illustrative embodiment, a system is provided that comprises a quantum computer subsystem, a hybrid superconductor-optical quantum repeater coupled to the quantum computer subsystem, and an interferometer subsystem coupled to the hybrid superconductor-optical quantum repeater. The hybrid superconductor-optical quantum repeater comprises an optical subsystem configured to receive an optical signal via an optical channel and a superconductor subsystem coupled to the optical subsystem. The optical subsystem and superconductor subsystem are coupled to one another via a microwave transmission medium. The optical subsystem is configured to receive an optical signal via the optical channel and down-convert a photon of the optical signal to a microwave photon in a microwave output signal that is output to the superconductor subsystem via the microwave transmission medium. The superconductor subsystem stores a quantum state of the microwave photon and transmits the microwave photon along an output channel from the superconductor subsystem.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for providing a hybrid superconductor-optical quantum repeater. The hybrid superconductor-optical quantum repeater of the illustrative embodiments operates to create entanglements of quantum states at stations, i.e. superconducting computing systems, separated by large distances. Moreover, the hybrid superconductor-optical quantum repeater of the illustrative embodiments may operate to provide superconducting qubits (or photons) with conversion to infrared or visible frequencies and vice versa. Thus, while quantum repeaters, such as that described in Munro et al., PCT Application No. WO 2007/021945 A2, may be generally known in the art, a hybrid superconductor-optical quantum repeater such as that described herein, which performs inter-conversion of optical and superconducting qubits (or photons), is not presently known.

Figure 1:
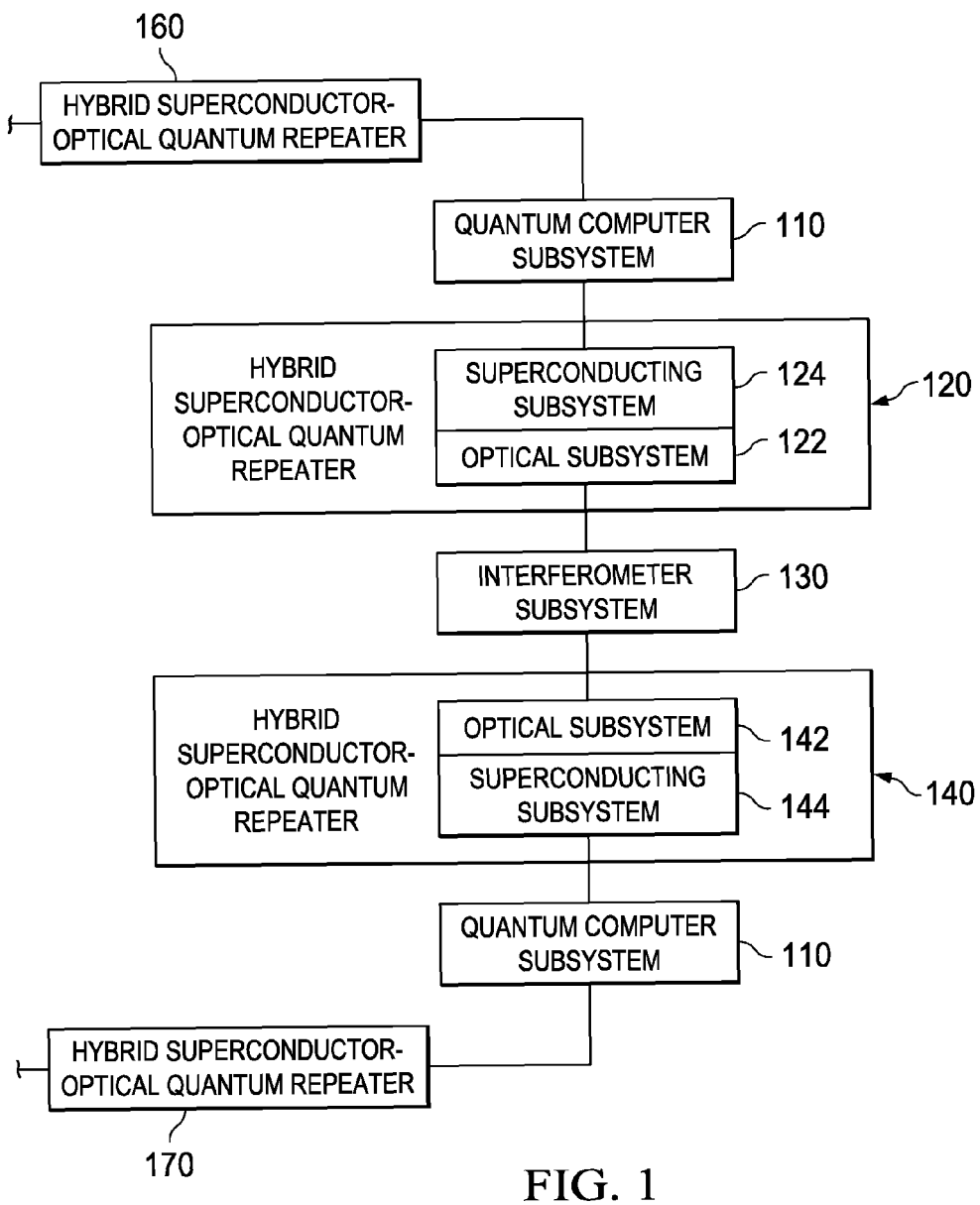
FIG. 1 is an example diagram of a quantum computing system utilizing the hybrid superconductor-optical quantum repeater mechanism of the illustrative embodiments.

FIG. 1 is an example diagram of a distributed quantum computing system, or a quantum communications system, utilizing the hybrid superconductor-optical quantum repeater mechanism of the illustrative embodiments. As shown in FIG. 1, the distributed quantum computing system comprises a plurality of quantum computer subsystems 110 and 150. The quantum computer subsystems 110 and 150 are superconducting structures involving circuits of superconducting devices. These circuits of superconducting devices comprise Josephson junctions which can move a received photonic qubit into the circuit, entangle it with other Josephson junction qubits, perform the quantum algorithms, perform quantum measurements on these qubits, and use the outcomes of these measurements to affect subsequent quantum operations in this subsystem or in other remote subsystems. An example of such a quantum computer subsystem that may be used as one or more of the quantum computer subsystems 110 and 150 is described in D. P. DiVincenzo, "The Physical Implementation of Quantum Computation," Fortschritte der Physik 48, 771-784 (2000), available at arxiv.org: quant-ph/0002077, which is hereby incorporated by reference.

Between the quantum computer subsystems 110 and 150 is provided a pair of hybrid superconductor-optical quantum repeaters 120 and 140 separated by an interferometer subsystem 130. A bi-directional communication channel is created between the quantum computing subsystems 110 and 150 via the hybrid superconductor-optical quantum repeaters 120 and 140 and the interferometer subsystem 130. Each hybrid superconductor-optical quantum repeater 120 is coupled to both an upstream and downstream quantum computer subsystem, either directly or indirectly through an interferometer subsystem 130 and another hybrid superconductor-optical quantum repeater 140. The details of the hybrid superconductor-optical quantum repeaters 120 and 140 will be provided hereafter. The interferometer subsystem 130 operates on optical signals and permits the creation of entanglements of two photons produced by two different hybrid superconductor-optical quantum repeaters. The interferometer subsystem 130 further makes photon measurements that will be transmitted to, and used by, the quantum computer subsystems 110 and 150 to determine if correct entanglements have been created or whether retransmission of qubit encoded photons is required.

The hybrid superconductor-optical quantum repeaters 120 and 140 each have two subsystems, an optical subsystem 122, 142 and a superconducting subsystem 124, 144. In one flow direction, the optical subsystem 122, 142 receives optical input signals having qubit encoded photons and down-converts these optical input signal photons (optical photons) to microwave wavelength signal photons (microwave photons) that are input to the superconducting subsystem 124, 144. In the superconducting subsystem 124, 144, the qubit encoded on the photon is stored in a qubit storage device. The superconducting subsystem 124, 144 encodes a microwave photon with the stored qubit through capacitive coupling of the qubit storage device with a transmission medium and outputs the microwave photon for propagation to a quantum computer subsystem.

In a second flow direction, the superconducting subsystem 124, 144, receives a microwave photon encoded with a qubit. The qubit is stored in the qubit storage device and is used to generate an output microwave photon that is transmitted via a microwave signal to the optical subsystem 122, 142. The optical subsystem 122, 142 then up-converts the microwave photon to an optical photon and outputs the optical photon to a next station along the quantum communication channel, e.g., an optical interferometer 130. It should be appreciated that the optical interferometer 130 is receiving photons from both the upstream and downstream stations, i.e. from the hybrid superconductor-optical quantum repeaters 120 and 140, and these photons are combined to generate an entangled pair of photons. The simultaneous arrival of two photons of the same frequency at opposite sides of a beam splitter is sufficient to entangle them. This is called Hong-Ou-Mandel interferometry, and is described in C. K. Hong, Z. Y. Ou, and L. Mandel, "Measurement of Sub-Picosecond Time Intervals Between Two Photons by Interference", Phys. Rev. Lett. 59, 2044-2046 (1987). Note that one half of each of the entangled pairs of photons, produced by quantum computer 110, is transmitted in the first flow direction (towards hybrid superconductor-optical quantum repeaters 160) while the other half of each entangled pair of photons is transmitted in the second flow direction (towards hybrid superconductor-optical quantum repeaters 120).

The optical interferometer 130 may operate in a similar manner to that of the measurement station 570 in FIG. 5B of the PCT Application WO 2007/021945 A2, hereby incorporated by reference, to determine if appropriate entanglement of optical photons has occurred. If appropriate entanglement of optical photons has not occurred, this information may be communicated back to the hybrid superconductor which may then retransmit the qubit encoded on an optical photon. Otherwise, successful entanglement may be communicated and retransmission is not performed.

Thus, looking again at FIG. 1, during a so-called "time reversed" mode of operation, each quantum computer subsystem 110 and 150 along a quantum communication channel generates a pair of entangled qubits, such as by utilizing a quantum gate or controlled NOT (CNOT), which is a conventional Boolean logic gate in quantum computing. These quantum computing subsystems 110 and 150 place these qubits, as microwave photons, into superconducting resonators which store the qubit state in a qubit storage device. There may, at this point, be a short delay while a simple error check is performed to confirm the presence of the photons in the resonators. Alternatively, these photons may be fed directly to the next step. Note that the quantum computer subsystems 110, 150 are each linked to both an upstream and a downstream hybrid superconductor-optical quantum repeater, e.g., quantum computer subsystem 110 is connected to upstream hybrid superconductor-optical quantum repeater 160 and downstream hybrid superconductor-optical quantum repeater 120 while quantum computer subsystem 150 is connected to upstream hybrid superconductor-optical quantum repeater 140 and downstream hybrid superconductor-optical quantum repeater 170. It should be noted that in this chain of quantum repeaters and quantum computer subsystems, there may be a source quantum computer subsystem and a termination quantum computer subsystem that are only connected to a single upstream or downstream hybrid superconductor-optical quantum repeater.

The quantum computer subsystem 110, 150 produces entangled pairs and transmits halves of these as microwave photons to both of the hybrid superconductor-optical quantum repeaters simultaneously, e.g., quantum computing system 110 transmits halves of the entangled pairs to the hybrid superconductor-optical quantum repeaters 160 and 120. The microwave photons are received in superconductor subsystem of the hybrid superconductor-optical quantum repeaters, e.g., superconductor subsystem 124 in hybrid superconductor-optical quantum repeater 120. The qubit state of the photon is stored in a qubit storage device of a superconducting resonator of the hybrid superconductor-optical quantum repeater prior to being transmitted along to the optical subsystem of the hybrid superconductor-optical quantum repeater.

In a next operation, focusing on just one of the halves of the entangled pairs (this operation is done in synchrony all along the chain of components comprising the quantum communications channel), the superconducting resonator of the superconductor subsystem outputs the microwave signal along a microwave transmission media, such as along a co-axial cable, to the optical subsystem, e.g., optical subsystem 122 of the hybrid superconductor-optical quantum repeater 120. The optical subsystem 122 mixes the microwave signal with a "local oscillator" infrared signal, which in one illustrative embodiment is a relatively intense reference laser beam that is available at all points on the quantum communication channel, to thereby up-convert the microwave photon to an infrared wavelength photon. The infrared wavelength photon is then transmitted out to an interferometer subsystem, such as interferometer subsystem 130.

At the interferometer subsystem 130, two infrared photons, one from an upstream hybrid superconductor-optical quantum repeater and one from a downstream hybrid superconductor-optical quantum repeater, meet simultaneously at a mirror of the interferometer subsystem 130. If a measurement of the two photons confirms that this has taken place, i.e. the simultaneous meeting at the mirror, then entanglement has been successfully generated between the qubits which remained behind in the qubit storage device in the upstream and downstream quantum computing devices. If a failure is detected, the entire operation is repeated. Further repetition of these basic operations results in a supply of entangled qubits in the quantum computer memories which will be further processed using entanglement purification and entanglement swapping until entangled quantum bits are present between the first and last quantum computing device, or subsystem, in the chain. With this resource, applications such as quantum cryptography, quantum secret sharing, and secure remote quantum computation are enabled.

In a second mode of operation, a so-called "direct" mode of operation, the series of operations set forth above is performed in a reverse order where the input to the hybrid superconductor-optical quantum repeater receives an optical signal having an encoded photon and down-converts the wavelength of the incoming optical signal to a microwave wavelength. That is, the optical subsystem 122 of the hybrid superconductor-optical quantum repeater receives an optical signal, such as an infrared signal with an infrared photon, and de-mixes it to down-convert the optical signal from a visible wavelength, e.g., an infrared wavelength, to a microwave wavelength signal and microwave photon. This microwave photon is transmitted to the superconductor subsystem 124 of the hybrid superconductor-optical quantum repeater via a microwave transmission medium, such as a co-axial cable, which stores the qubit state of the microwave photon in a qubit storage device of the superconductor subsystem 124. The microwave signal, and microwave photon, are then output to a next station along the quantum communication channel, e.g., a quantum computer subsystem 110 or the like.

In one illustrative embodiment, the optical signal has a telecommunications frequency of approximately 200 Terahertz that contains the photons, or qubits, and a second having a wavelength in the microwave band of approximately 6 Gigahertz. The optical signal is input to the optical subsystem 122 of the hybrid superconductor-optical quantum repeater of the illustrative embodiments which has a mixing region that maps the state/attributes of photons/qubits of the original 200 Terahertz signal to photons in the microwave band wavelength signal. The microwave band wavelength signal, with the mapped photons/qubit state/attributes, are transmitted to the superconductor subsystem 124 that supports electrical vibration at the frequency of the input microwave band wavelength signal such that it stores the photon/qubit state/attribute in a qubit storage device, i.e. the superconductor subsystem maintains the quantum state information for the qubits mapped to the microwave wavelength signal photons. For example, the qubit storage device holds the microwave photon of the microwave band wavelength signal as electrical energy in a high quality factor transmission line resonator.

Thus, the hybrid superconductor-optical quantum repeater of the illustrative embodiments operates to convert incoming quanta of radiation, in single quantum pulses of light, from the optical range of frequency, i.e. infrared frequency, to a microwave range of frequencies, or vice versa. Moreover, the hybrid superconductor-optical quantum repeater is superconducting in that the optical system feeds into a superconducting subsystem that stores the quantum information obtained from the optical subsystem which has been down-shifted from the infrared frequency range to the microwave frequency range. In a reverse operation, the hybrid superconductor up-shifts the quantum information obtained from the superconducting subsystem from the microwave frequency to the infrared frequency range. The hybrid superconductor-optical quantum repeater may operate to perpetuate the quantum information along an output to a next station along the quantum communication channel from a source quantum computer subsystem to a destination quantum computer subsystem.

Figure 2:
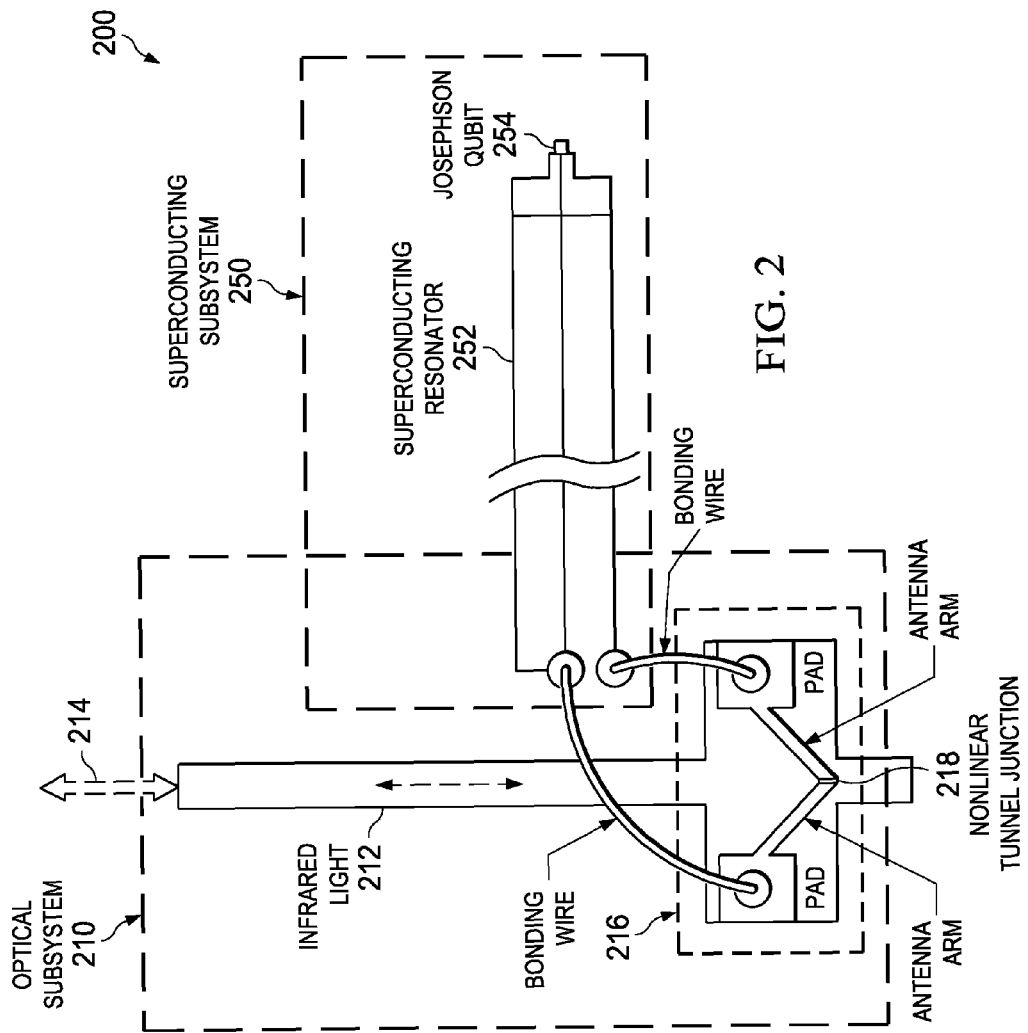
FIG. 2 is an example block diagram of a hybrid superconductor-optical quantum repeater mechanism in accordance with one illustrative embodiment.

FIG. 2 is an example block diagram of a hybrid superconductor-optical quantum repeater in accordance with one illustrative embodiment. With the hybrid superconductor-optical quantum repeater 200 of the illustrative embodiments, two subsystems 210 and 250 are provided. First, an optical subsystem 210 is provided that operates on input signals that are in the optical wavelengths to down-convert these optical wavelength input signals to a microwave wavelength signal, and operates on input microwave wavelength signals to up-convert these signals to an optical wavelength output signal. In one illustrative embodiment, the optical subsystem 210 operates at infrared frequencies.

The optical subsystem 210 includes an integrated nanowire waveguide 212 for coupling telecommunication-wavelength infrared light, such as infrared signals in the 200 TeraHertz wavelength range, in from the outside world, i.e. from an upstream quantum computer subsystem via another hybrid superconductor-optical quantum repeater, interferometer subsystem, or the like, via a transmission medium 214, such as an optical fiber. Over this waveguide 212 is placed an antenna arm structure 216 which feeds the infrared-frequency electric fields to a nano-scale tunnel junction 218. This tunnel junction 218 has a nonlinear current-to-voltage (I-V) characteristic. In current practice, this nonlinearity permits the optical power, at approximately 1.6 μm wavelength (about 200 THz frequency) in one illustrative embodiment, to be converted to a DC current source, according to the law:

$$I(\omega=0)=\eta E(\omega_{opt})E^*(\omega_{opt}) \quad (1)$$

where I is the current, $\eta$ is an efficiency coefficient, $\omega=0$ indicates that the output, as a current source, is at DC, $\omega_{opt}$ is the frequency for the incoming optical signal, and E is the electric field at the tunnel junction. The effective current source is observed to be accompanied by a 100Ω source impedance. The efficiency coefficient $\eta$ is observed to be approximately 6% of the quantum limit, i.e. the largest amount of electric current that can in principle be produced in such an optical system. That is, the value of $\eta$ is such that one photon of optical energy per unit time produces a current of 0.06 electrons per unit time. Modeling indicates that this efficiency could grow to around 50% of the quantum limit.

Second, returning to FIG. 2, a superconducting subsystem 250 is coupled to the optical subsystem 210. In one illustrative embodiment, the superconducting subsystem 250 operates on signals at approximately a few GHz, e.g., less than 10 GHz, operating frequency. With the illustrative embodiments, the mode of optical operation is modified from the previous art such that instead of one optical field, two are introduced. One of these fields is the signal photon from the upstream infrared systems (e.g., interferometer). The second field is a "local oscillator" a strong laser beam transmitted on the same optical fiber from a common location. The frequency of the signal photon and that of the local oscillator are different, so that the current source produced by the nonlinear interactions of the optical fields is at finite frequency:

$$I(\Delta\omega)=\eta E(\omega_{opt})E^*(\omega_{opt}+\Delta\omega) \quad (2)$$

In one illustrative embodiment, $\Delta\omega$ is approximately 6 GHz, matching the characteristic frequency of the superconducting subsystem 250. The optical field at $\omega_{opt}$ serves as a strong reference oscillator (the local oscillator), while the optical field at $\omega_{opt}+\Delta\omega$ is the weak, or few-photon, field which will carry the quantum information or cryptographic information on the communication channel 214. That is, when the down-conversion occurs at the nonlinear tunnel junction 218, the quantum information that was carried in the infrared photon is converted to quantum information carried by a microwave photon. It is this microwave photon that travels up the bonding wires and thence to the superconductor subsystem 250.

The optical subsystem 210 is joined by a proximate electrical connection comprising a superconducting transmission line resonator 252, with a superconducting Josephson qubit storage device attached. The superconducting transmission line resonator 252 frequency is $\Delta\omega$. Thus, the action of the joined pair of subsystems 210 and 250 is, by the heterodyning action of the reference oscillator $\omega_{opt}$, to map an optical photon at frequency $\omega_{opt}+\Delta\omega$ to a microwave resonator photon at frequency $\Delta\omega$. It is acceptable for the efficiency of mapping to be far below the quantum limit of efficiency; in this instance a quantum efficiency of 1 would correspond to every signal infrared photon generating exactly one microwave photon. If the photon mapping does not occur correctly, the absence of the photon will shortly be detected by another quantum computer subsystem. When the absence of the photon is noted by the other quantum computer subsystem, the transmission of the photon can be retried.

As an example, for a "direct" mode of operation of the hybrid superconductor-optical quantum repeater, i.e. in a mode of operation in which the input to the hybrid superconductor-optical quantum repeater is an optical signal that is down-converted to a microwave wavelength, as governed by Equation (2) above, a case where the laws of classical physics are operative is first discussed. Suppose that a steady signal $E(\omega_{opt})$ is present. Then, over some time interval $\Delta T$, power is present at the sideband frequency $\omega_{opt}+\Delta\omega$. During that time interval, the optical subsystem 210 acts like a current source I, as in Equation (2), driving the superconducting subsystem 250 at frequency $\Delta\omega$. As $\Delta\omega$ is assumed to be the resonant frequency of the superconducting transmission line resonator 252, this superconducting transmission line resonator 252 will be "rung up" by this excitation. After the pulse has ended, the resonator 252 will be left in a state with some energy in the mode at frequency $\Delta\omega$. In classical signal transmission, where the presence or absence of optical energy indicates the bit state 0 or 1, this bit state will now be stored in the state of energy of the resonator, which could further be subject to error correction protocols to achieve repeater function for classical signals.

Speaking now in quantum mechanical language, the field $E(\omega_{opt}+\Delta\omega)$ must be treated as a quantum operator. The statistical properties of this operator are indicative of the quantum state of the infrared light at this frequency, i.e. it may be squeezed in a certain way, or it may consist of discrete packets of energy ("photons"). The action of the current source, therefore, is also quantum mechanical and will drive the superconducting transmission line resonator 252 of the superconducting subsystem 250 in a way that reflects the quantum statistics of the infrared light. Therefore, in ideal operation, a single photon in the infrared beam will be deposited as a single photon in the superconducting transmission line resonator 252.

In a second mode of operation, i.e. the "time-reversed" mode of operation, a microwave photon is mapped onto an outgoing infrared photon. At a time determined by the overall clocking of the quantum computer subsystems, a microwave photon is placed by that quantum computer onto the superconducting resonator of the hybrid repeater, thereby storing it temporarily. By the "ringdown" of this resonator, the microwave-frequency electric field of this quantum of radiation impinges on the nonlinear tunnel junction device. The nonlinear tunnel junction device mixes the microwave field with the local oscillator field, according to the equation analogous to equation (2):

$$I(\omega_{opt}+\Delta\omega)=\eta E(\omega_{opt})E^*(\Delta\omega) \quad (3)$$

Thus is a current produced at the up-converted infrared frequency $\omega_{opt}+\Delta\omega$. This current is a quantum-mechanical operator, reflecting all the quantum statistics of the original microwave quantum of radiation. The current is the source for a radiation field; the radiation so produced travels away from the hybrid repeater, to the next component in the chain (i.e., the interferometer system). Two such infrared photons, meeting simultaneously at the interferometer, cause the creation of entanglement between an upstream and a downstream quantum computer.

Figure 3:
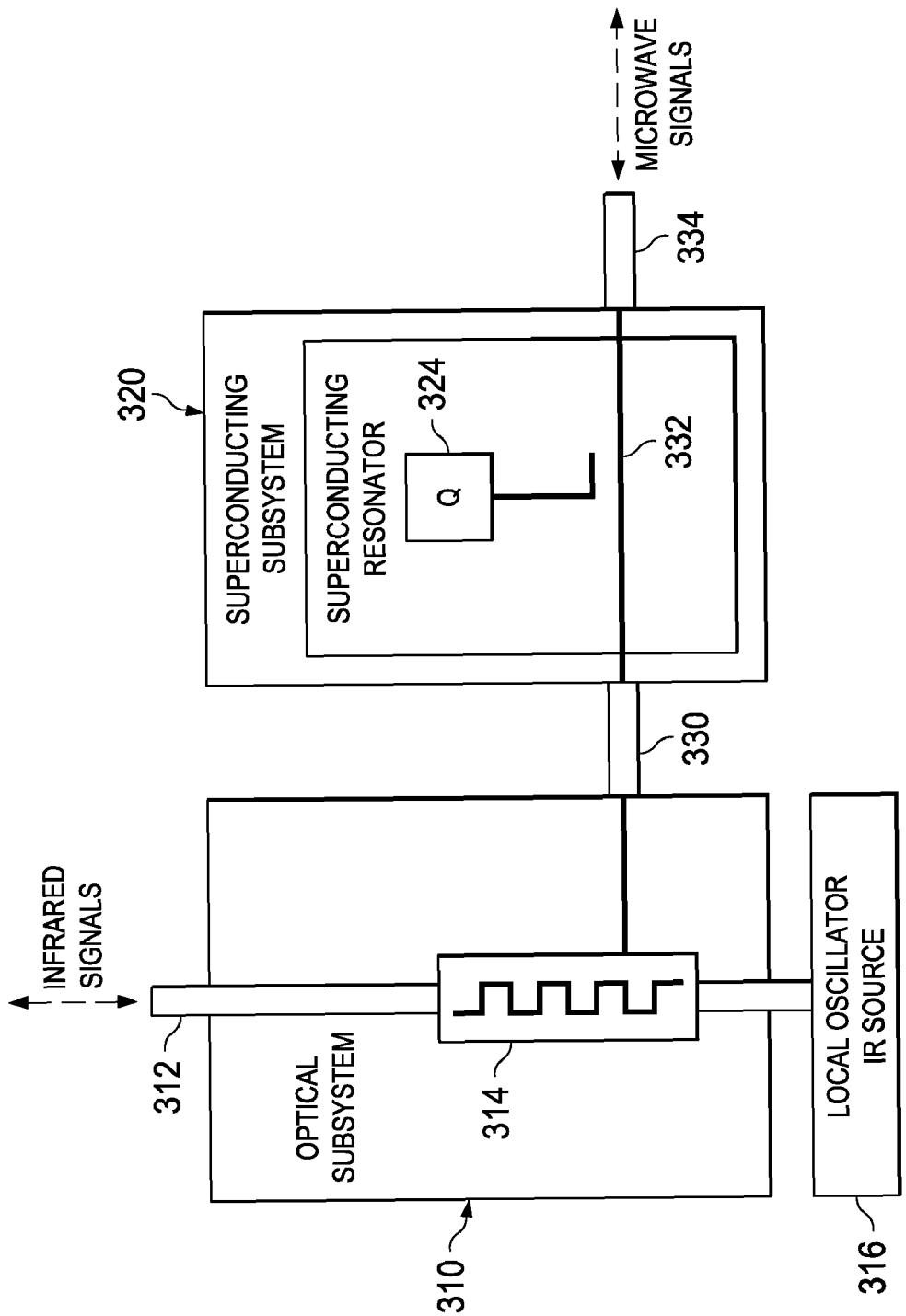
FIG. 3 is another block diagram of a hybrid superconductor-optical quantum repeater showing additional details in accordance with one illustrative embodiment.

FIG. 3 is another block diagram of a hybrid superconductor-optical quantum repeater showing additional details in accordance with one illustrative embodiment. As previously described, and shown again in FIG. 3, the hybrid superconductor-optical quantum repeater 300 comprises an optical subsystem 310 and a superconductor subsystem 320. The optical subsystem 310 has an optical communication channel 312, which may comprise an optical fiber for example, that is coupled to an active region, also referred to as a mixing region 314. As described previously, the mixing region 314 may comprise that nano-wire waveguide 212, antenna arm structure 216 and nano-scale tunnel junction 218 in FIG. 2.

The mixing region 314 operates to down-convert optical wavelength signals, such as infrared wavelength signals, to a microwave wavelength signal, or to up-convert microwave wavelength signals to an optical wavelength signal. For example, the mixing region 314 may receive an optical input via the optical communication channel 312, that has two superimposed signals having two different wavelengths. A first wavelength signal may be an optical signal having a wavelength in the visible range of the spectrum, e.g., an infrared wavelength corresponding to 200 Terahertz. A second wavelength signal may be another infrared signal shifted from the first by 6 Gigahertz. The mixing region 314 maps a photon in the first wavelength signal to a photon in the difference wavelength signal and outputs the second wavelength signal photon to the superconductor subsystem 320. Alternatively, the mixing region 314 may map an input microwave photon from the superconductor subsystem 320 onto a photon of an infrared signal, such as may be supplied by a local oscillator IR source 316, e.g., a laser or the like, and output the infrared signal via the optical communication channel 312. The mixing region is kept at a cold temperature so that only a small number of thermally generated microwave photons enter the system. The temperature in this region, however, can be above "mixing-chamber" temperature, i.e. approximately 30° miliKelvin (mK), and may be as high as approximately 4° Kelvin (K).

Microwave signals are transmitted between the optical subsystem 310 and the superconductor subsystem 320 via the microwave transmission medium 330, which in one illustrative embodiment is a semi-rigid subminiature version A (SMA) cable, such as a co-axial cable. The microwave transmission medium 330 couples the mixing region 314 with a superconducting resonator 322 which has a qubit storage device 324 capacitively coupled to the microwave transmission medium 332 running through the superconductor subsystem 320. The microwave transmission medium 332 couples to an output microwave transmission medium 334 which can output microwave signals to quantum computer subsystems or the like. The superconductor subsystem 320 is kept at a temperature below the boiling point of Helium, i.e. below 4° K by a refrigeration plate; or a temperature of 30° mK, achieved in the mixing chamber of a dilution refrigerator, may be desirable. These low operating temperatures reduce the effects of random radiation which objects emit at room temperature. In one illustrative embodiment, the superconductor subsystem 320 is kept approximately at 4° K, or at 30° mK.

Figure 4:
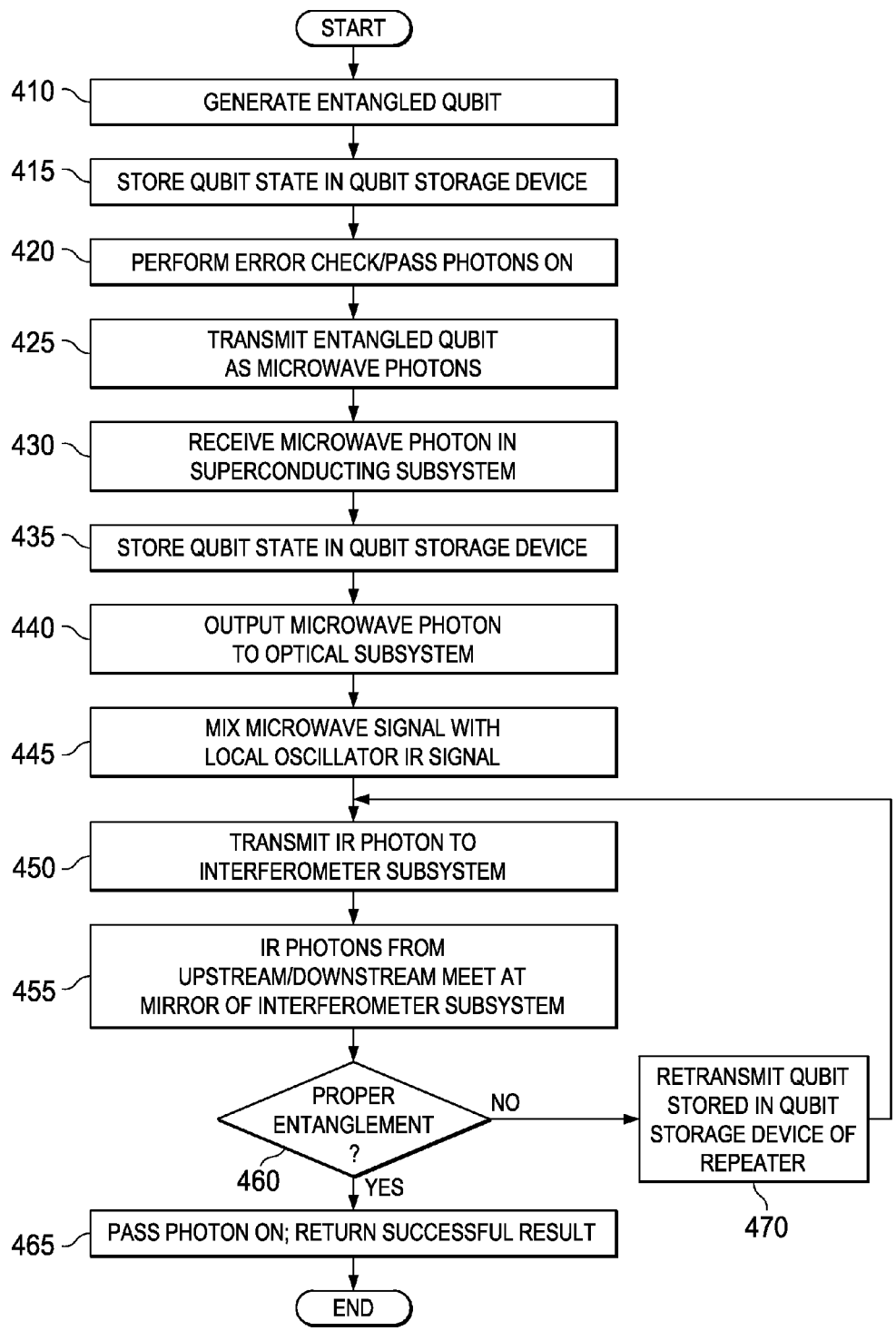
FIG. 4 is a flowchart outlining an example operation of a hybrid superconductor-optical quantum repeater when operating in a time reversed mode of operation in accordance with one illustrative embodiment.
Figure 5:
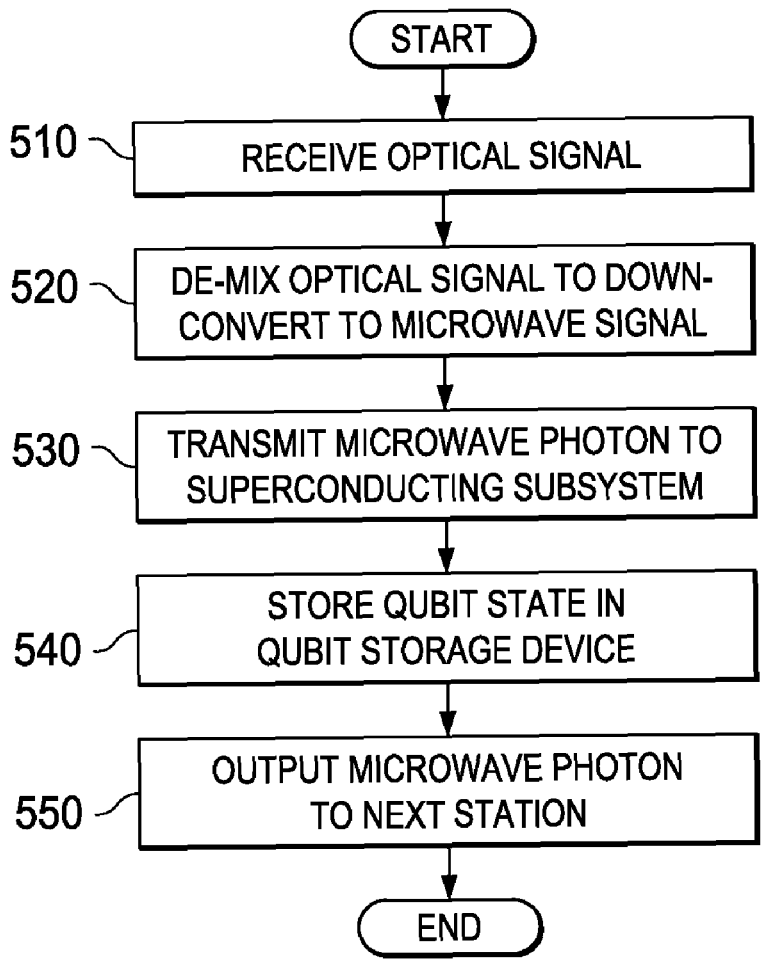
FIG. 5 is a flowchart outlining an example operation of a hybrid superconductor-optical quantum repeater when operating in a direct mode of operation in accordance with one illustrative embodiment.

FIG. 4 is a flowchart outlining an example operation of a hybrid superconductor-optical quantum repeater when operating in a time reversed mode of operation in accordance with one illustrative embodiment. FIG. 5 is a flowchart outlining an example operation of a hybrid superconductor-optical quantum repeater when operating in a direct mode of operation in accordance with one illustrative embodiment. Operations described in FIGS. 4 and 5, not attributed to other elements of a quantum communication channel, may be performed by the hybrid superconductor-optical quantum repeaters of FIGS. 1-3 above.

As shown in FIG. 4, the operation starts with a quantum computer subsystem generating an entangled qubit (step 410) and placing the qubit, as microwave photons, into a superconducting resonator which stores the qubit state in a qubit storage device (step 415). A simple error check is performed to confirm the presence of the photons in the resonator (step 420). Alternatively, these photons may be fed on directly to the next operation. The quantum computer subsystem transmits these entangled qubits, as a microwave photons, to both of the hybrid superconductor-optical quantum repeaters coupled to it simultaneously (step 425). The microwave photons are received in a superconductor subsystem of the hybrid superconductor-optical quantum repeater (step 430). The qubit state of the photon is stored in a qubit storage device of a superconducting resonator of the hybrid superconductor-optical quantum repeater prior to being transmitted along to the optical subsystem of the hybrid superconductor-optical quantum repeater (step 435).

The superconducting resonator of the superconductor subsystem outputs the microwave signal along a microwave transmission medium to the optical subsystem of the hybrid superconductor-optical quantum repeater (step 440). The optical subsystem mixes the microwave signal with a "local oscillator" infrared signal to thereby up-convert the microwave photon to an infrared wavelength photon (step 445). The infrared wavelength photon is then transmitted out to an interferometer subsystem (step 450).

At the interferometer subsystem, two infrared photons, one from an upstream hybrid superconductor-optical quantum repeater and one from a downstream hybrid superconductor-optical quantum repeater, meet simultaneously at a mirror of the interferometer subsystem (step 455). If a measurement of the two photons confirms that this has taken place (step 460), then entanglement has been successfully generated between the qubits and the interferometer subsystem returns a message to the quantum computing subsystem indicating successful entanglement of the qubits with no need for retransmission of the qubit (step 465). If a failure is detected, the interferometer subsystem may return a message indicating the failure and initiating repetition of the operation to retransmit the qubit (step 470).

With reference now to FIG. 5, with the "direct" mode of operation, the optical subsystem of the hybrid superconductor-optical quantum repeater receives an optical signal, such as an infrared signal with an infrared photon, via an optical communication channel, such as an optical fiber (step 510). The optical sub-system de-mixes the optical signal to down-convert the optical signal from a visible wavelength to a microwave wavelength signal and thereby map an infrared photon to a microwave photon (step 520). This microwave photon is transmitted to the superconductor subsystem of the hybrid superconductor-optical quantum repeater via a microwave transmission medium (step 530). The superconductor subsystem stores the qubit state of the microwave photon in a qubit storage device of a superconducting resonator of the superconductor subsystem (step 540). The microwave signal, a microwave photon, is then output to a next station along the quantum communication channel, e.g., a quantum computer subsystem or the like (step 550).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A hybrid superconductor-optical quantum repeater, comprising:
   an optical subsystem configured to receive an optical signal via an optical channel; and
   a superconductor subsystem coupled to the optical subsystem, wherein the optical subsystem and superconductor subsystem are coupled to one another via a microwave transmission medium, and wherein:
   the optical subsystem is configured to receive an optical signal via the optical channel and down-convert a photon of the optical signal to a microwave photon in a microwave output signal that is output to the superconductor subsystem via the microwave transmission medium, and
   the superconductor subsystem stores a quantum state of the microwave photon and transmits the microwave photon along an output channel from the superconductor subsystem.

2. The hybrid superconductor-optical quantum repeater of claim 1, wherein the optical signal comprises a first signal having an infrared wavelength and a second signal having an infrared wavelength shifted from the first signal by an amount corresponding to a microwave wavelength.

3. The hybrid superconductor-optical quantum repeater of claim 1, wherein the optical subsystem comprises an electronic device coupled to the optical channel, the electronic device having a non-linear current-to-voltage characteristic, and wherein the electronic device converts optical power to a current source operating at microwave frequency.

4. The hybrid superconductor-optical quantum repeater of claim 3, wherein the electronic device comprises:
   a non-wire waveguide;
   an antenna arm structure placed over the waveguide; and
   a nano-scale tunnel junction, wherein the antenna feeds an infrared frequency electric field of the optical signal to the nano-scale tunnel junction which converts the optical power to the current source operating at microwave frequency.

5. The hybrid superconductor-optical quantum repeater of claim 1, wherein the superconductor subsystem comprises a superconducting transmission line resonator having a Josephson qubit storage device, and wherein the optical subsystem is joined by an electrical connection to the superconducting transmission line resonator of the superconductor subsystem.

6. The hybrid superconductor-optical quantum repeater of claim 1, wherein:
   the superconductor subsystem is configured to receive a microwave input signal, store a quantum state of a microwave photon of the microwave input signal, and transmit the microwave photon in an output microwave signal along an output channel to the optical subsystem; and
   the optical subsystem is configured to receive the output microwave signal, up-convert the microwave photon of the output microwave signal to an infrared photon, and output the infrared photon in an output infrared signal that is output via an optical channel.

7. A method, in a hybrid superconductor-optical quantum repeater, for transmitting qubits between quantum computer subsystems, comprising:
   receiving an optical input signal in an optical subsystem of the hybrid superconductor-optical quantum repeater from a first quantum computer subsystem;
   down-converting the optical input signal to a microwave signal, thereby mapping a optical wavelength photon of the optical input signal to a microwave wavelength photon of the microwave signal;
   inputting the microwave signal to a superconductor subsystem of the hybrid superconductor-optical quantum repeater;
   storing a quantum state of the microwave wavelength photon in the superconductor subsystem; and
   transmitting the microwave wavelength photon along an output channel from the superconductor subsystem.

8. The method of claim 7, wherein the optical signal comprises a first signal having an infrared wavelength and a second signal having an infrared wavelength shifted from the first signal by an amount corresponding to a microwave wavelength.

9. The method of claim 7, wherein the optical subsystem comprises an electronic device coupled to the optical channel, the electronic device having a non-linear current-to-voltage characteristic, and wherein down-converting the optical input signal comprises the electronic device converting optical power to a DC current source operating at microwave frequency.

10. The method of claim 9, wherein the electronic device comprises:
a non-wire waveguide;
an antenna arm structure placed over the waveguide; and
a nano-scale tunnel junction, wherein down-converting the optical input signal comprises the antenna feeding an infrared frequency electric field of the optical signal to the nano-scale tunnel junction which converts the optical power to the current source operating at microwave frequency.

11. The method of claim 7, wherein the superconductor subsystem comprises a superconducting transmission line resonator having a Josephson qubit storage device, and wherein the optical subsystem is joined by an electrical connection to the superconducting transmission line resonator of the superconductor subsystem.

12. The method of claim 7, wherein the superconductor subsystem:
receives a microwave input signal,
stores a quantum state of a microwave photon of the microwave input signal, and
transmits the microwave photon in an output microwave signal along an output channel to the optical subsystem, and wherein the optical subsystem:
receives the output microwave signal,
up-converts the microwave photon of the output microwave signal to an infrared photon, and
outputs the infrared photon in an output infrared signal that is output via an optical channel.

13. A system, comprising:
a quantum computer subsystem;
a hybrid superconductor-optical quantum repeater coupled to the quantum computer subsystem; and
an interferometer subsystem coupled to the hybrid superconductor-optical quantum repeater, wherein the hybrid superconductor-optical quantum repeater comprises:
an optical subsystem configured to receive an optical signal via an optical channel; and
a superconductor subsystem coupled to the optical subsystem, wherein the optical subsystem and superconductor subsystem are coupled to one another via a microwave transmission medium, and wherein:
the optical subsystem is configured to receive an optical signal via the optical channel and down-convert a photon of the optical signal to a microwave photon in a microwave output signal that is output to the superconductor subsystem via the microwave transmission medium, and
the superconductor subsystem stores a quantum state of the microwave photon and transmits the microwave photon along an output channel from the superconductor subsystem.

14. The system of claim 13, wherein:
the superconductor subsystem is coupled to the quantum computer subsystem,
the optical subsystem is coupled to the interferometer subsystem,
the optical signal is received from the interferometer subsystem, and
the microwave photon is transmitted along the output channel from the superconductor subsystem to the quantum computer subsystem.

15. The system of claim 13, wherein the optical signal comprises a first signal having an infrared wavelength and a second signal having an infrared wavelength shifted from the first by an amount corresponding to a microwave wavelength.

16. The system of claim 13, wherein the optical subsystem comprises an electronic device coupled to the optical channel, the electronic device having a non-linear current-to-voltage characteristic, and wherein the electronic device converts optical power to a current source operating at microwave frequency.

17. The system of claim 16, wherein the electronic device comprises:
a non-wire waveguide;
an antenna arm structure placed over the waveguide; and
a nano-scale tunnel junction, wherein the antenna feeds an infrared frequency electric field of the optical signal to the nano-scale tunnel junction which converts the optical power to the current source operating at microwave frequency.

18. The system of claim 13, wherein the superconductor subsystem comprises a superconducting transmission line resonator having a Josephson qubit storage device, and wherein the optical subsystem is joined by an electrical connection to the superconducting transmission line resonator of the superconductor subsystem.

19. The system of claim 13, wherein:
the superconductor subsystem is configured to receive a microwave input signal, store a quantum state of a microwave photon of the microwave input signal, and transmit the microwave photon in an output microwave signal along an output channel to the optical subsystem; and
the optical subsystem is configured to receive the output microwave signal, up-convert the microwave photon of the output microwave signal to an infrared photon, and output the infrared photon in an output infrared signal that is output via an optical channel.

20. The system of claim 13, wherein the quantum computer subsystem is coupled to a second superconducting subsystem of a second hybrid superconductor-optical quantum repeater, and wherein a second optical subsystem of the second hybrid superconductor-optical quantum repeater is coupled to a second interferometer.

* * * * *